United States Patent [19]

Chowaniec

[11] 4,276,450
[45] Jun. 30, 1981

[54] METHOD AND APPARATUS FOR IMPROVING TELEPHONE HYBRID NETWORK

[75] Inventor: Adam Chowaniec, Ottawa, Canada

[73] Assignee: Northern Telecom Limited, Montreal, Canada

[21] Appl. No.: 72,365

[22] Filed: Sep. 5, 1979

[51] Int. Cl.³ ............................................. H04B 3/20
[52] U.S. Cl. ............................ 179/170 D; 179/170.2; 179/175.31 E
[58] Field of Search ............ 179/170 D, 170.2, 170.6, 179/170.8, 175.31 R, 175.31 E, 78, 79, 80

[56] References Cited
U.S. PATENT DOCUMENTS

| 3,161,838 | 12/1964 | Flanagan et al. | 179/170.6 |
| 3,290,452 | 12/1966 | Olson | 179/175.31 E |
| 3,588,385 | 6/1971 | Moye | 179/170.2 |
| 3,982,080 | 9/1976 | Ukeiley | 179/170 D |
| 4,096,362 | 6/1978 | Crawford | 179/170 D |
| 4,224,483 | 9/1980 | Neigh et al. | 179/175.2 R |

Primary Examiner—James W. Moffitt
Assistant Examiner—Randall P. Myers
Attorney, Agent, or Firm—John E. Mowle

[57] ABSTRACT

A circuit and method for controlling the connection of a cancellation network between the four-wire input and output of a hybrid transformer at the two-wire to four-wire interface of a telephone line. The relative phase of a signal applied to the four-wire input appearing on the four-wire output, is used to determine whether the two-wire telephone line appears loaded or non-loaded. This in turn controls the selection of the appropriate cancellation network which will give the greatest singing return loss.

2 Claims, 4 Drawing Figures

METHOD AND APPARATUS FOR IMPROVING TELEPHONE HYBRID NETWORK

This invention relates to a circuit and method for controlling the connection of one of a plurality of line balance impedances to a hybrid network in order to enhance the singing return loss of a two-wire to four-wire interface of a telephone line.

BACKGROUND OF THE INVENTION

One of the major problems faced in telephone communications is to maintain the singing return loss on the telephone loop at an acceptable level. This problem is particularly aggravated when long distance communications are encountered where the circuit switches from a two-wire to four-wire configuration utilizing a hybrid network. The various terminating impedances and loop lengths encountered on the two-wire side of the system make it impossible to provide a good match across the whole audio spectrum utilizing a single balance impedance on the hybrid network. The result is that the singing return loss (i.e. the amount of signal coupled between the input and output of the four-wire path) varies not only with frequency but also with the length of the two-wire line, any inductive loading applied to the line to compensate for high frequency roll-off, and the terminating impedance (e.g. the telephone) at the far end of the loop. In general a margin of 4 dB or more singing return loss (SRL) is required for all loops. The SRL is defined as the minimum return loss (RL(f)) for a given loop and balance network over the frequency range where:

$$RL(f) = T(f) - T(s)$$

where T(f) is the transhybrid loss at frequency f (i.e. the ratio of the output/input signals at the four-wire port (in dB) at a frequency f); and T(s) is the transhybrid loss at 1000 Hz with the hybrid short-circuited at the two-wire port.

Various solutions have been proposed for this problem. These include multiple balance impedances for the hybrid network; voice switched loss in the four-wire path; the introduction of fixed loss in the four-wire path; and echo cancellation. Those solutions such as introducing fixed attenuation in the four-wire path improve the return loss at the expense of lower speech signal levels and consequently are not considered very satisfactory. Other solutions such as echo cancellation can provide very good results, however at a price which is usually too high to justify implementation on a per-line basis. As a result, these techniques are only utilized at the present time in specialized applications such as overseas communications by satellite. Thus, any solution must not only be technically acceptable but must also be cost effective in order to justify implementation on a line by line basis.

As mentioned above, one solution is to select one of a plurality of balance impedances for the hybrid in order to provide a better match with a particular two-wire loop impedance. However, in order to do this, it is necessary that there be some indication of the impedance of the two-wire loop in order to determine which balance impedance is to be utilized. To be effective, this must be done on a periodic basis, normally at the commencement of each telephone call. One procedure is to first disconnect the two-wire line from the hybrid and then measure the line impedance, so that the correct balance impedance can be connected to the hybrid network. However, this solution is generally expensive to implement and not acceptable to the telephone operating companies.

Telephone lines (i.e. those between the central office and the terminating set) are generally divided into two major groups, those that are inductively loaded utilizing loading coils, (or which exhibit such characteristics) and those that are nonloaded (or exhibit nonloaded characteristics). It has been found that a relatively simple method of determining either of these conditions is to measure the phase delay of a return signal on the four-wire output of the hybrid network which was applied to the input. It has also been found that this test yields sufficient information to control the selection of the correct balance impedance or network to be utilized.

STATEMENT OF THE INVENTION

Thus, the present invention provides a circuit for improving the singing return loss between the opposed four-wire input and output of a hybrid network for the two-wire to four-wire interface of a telephone line. The circuit comprises a signal generator for connecting a transmit signal to the four-wire input. In addition, the circuit is characterized by a phase comparison circuit to determine whether the relative phase of the return signal from the four-wire output with respect to that of said input is greater or less than a selected value, so as to indicate whether the two-wire line appears inductively loaded or nonloaded. In addition, the inventive circuit includes a control circuit responsive to the appearance of an inductively loaded or nonloaded line by the phase comparison circuit for connecting a respective first or a second balance impedance to improve the singing return loss.

In one embodiment, the phase comparison circuit comprises a frequency counter triggered by zero crossings of the return signal on the output of the four-wire line, for determining the period of the return signal. Also, a delay measuring circuit triggered by zero crossings of the transmit and return signals is used to determine the phase delay therebetween and hence whether the two-wire line appears inductively loaded or nonloaded. In this embodiment, the control circuit is only responsive to an indication of a loaded or nonloaded state of the telephone line by the delay measuring circuit (for connecting the first or second balance impedance network) when the frequency counter indicates the period of the return signal is the same as that of the transmit signal, in order to reject spurious measurement of phase delay.

The invention also encompasses a method of improving the singing return loss between the opposed four-wire input and output of a hybrid network in a two-wire to four-wire interface for a telephone line which comprises the steps of: connecting a signal to the input of the four-wire line; comparing the phase of the return signal at the output with that of the signal at the input to determine whether the two-wire line appears inductively loaded or nonloaded. In response to the results of the phase comparison to determine a loaded or nonloaded line, the method comprises connecting a respective first or a second impedance network between the input and output to cancel at least part of the signal coupled between said input and output of the hybrid network.

BRIEF DESCRIPTION OF THE DRAWINGS

An example embodiment of the invention will now be described with reference to the accompanying drawings in which.

DESCRIPTION OF THE PREFERRED EMBODIMENT

Figure 1:
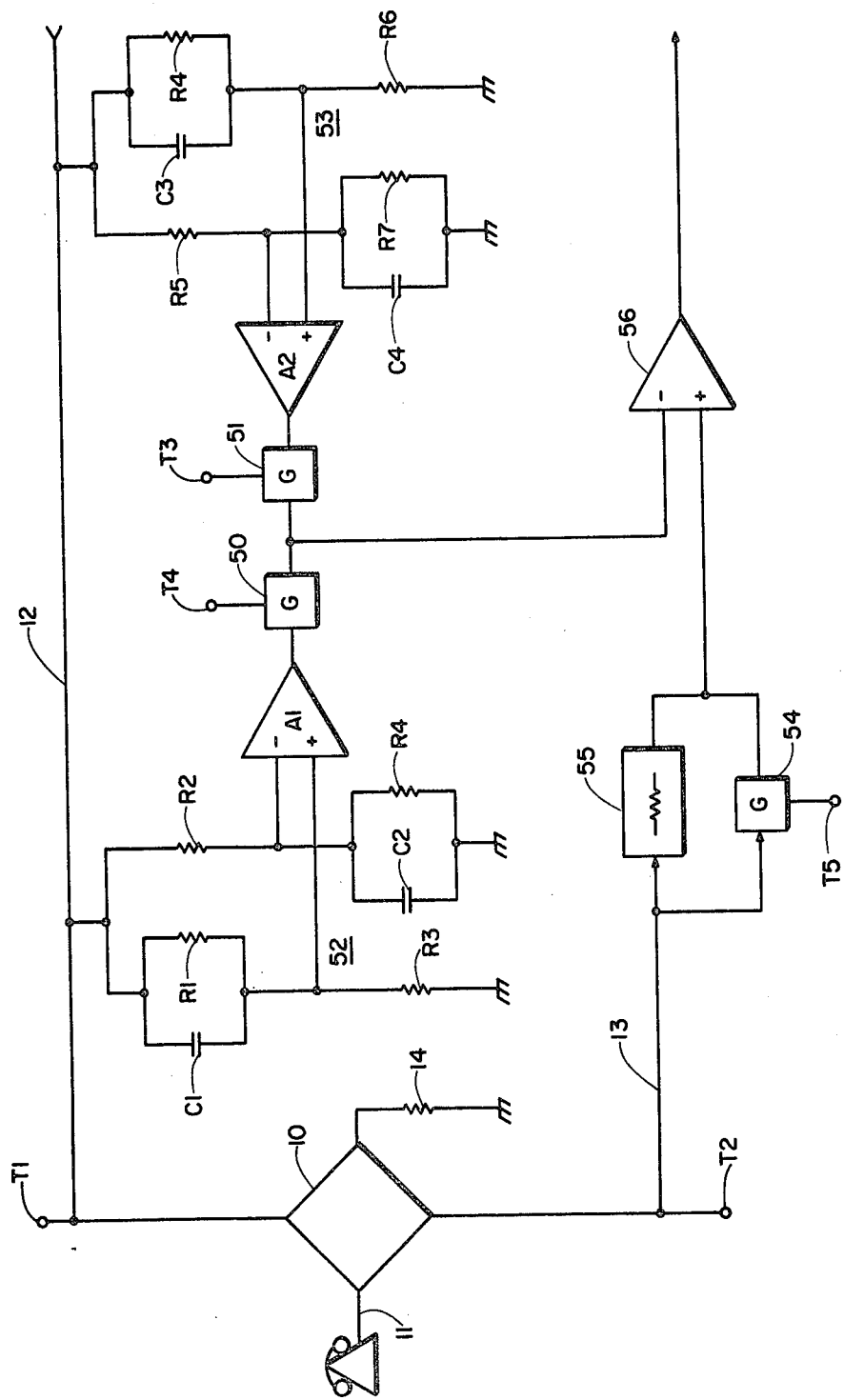
FIG. 1 is a block and schematic circuit diagram of a telephone line balancing network in accordance with the present invention.

FIG. 1 illustrates the basic elements of a telephone line comprising a hybrid 10, at the two-wire 11 to four-wire 12 and 13 conventional interface of a telephone line. Also shown is a balance impedance 14 which is connected from the hybrid 10 to ground. The detailed structure of the telephone line balancing network of FIG. 1 and the phase comparison and control circuit of FIG. 2 used to enhance the singing return loss will be readily apparent from the following combined description of its function and operation. In these two figures, corresponding reference characters T1–T5 designate the interconnections between them.

Figure 2:
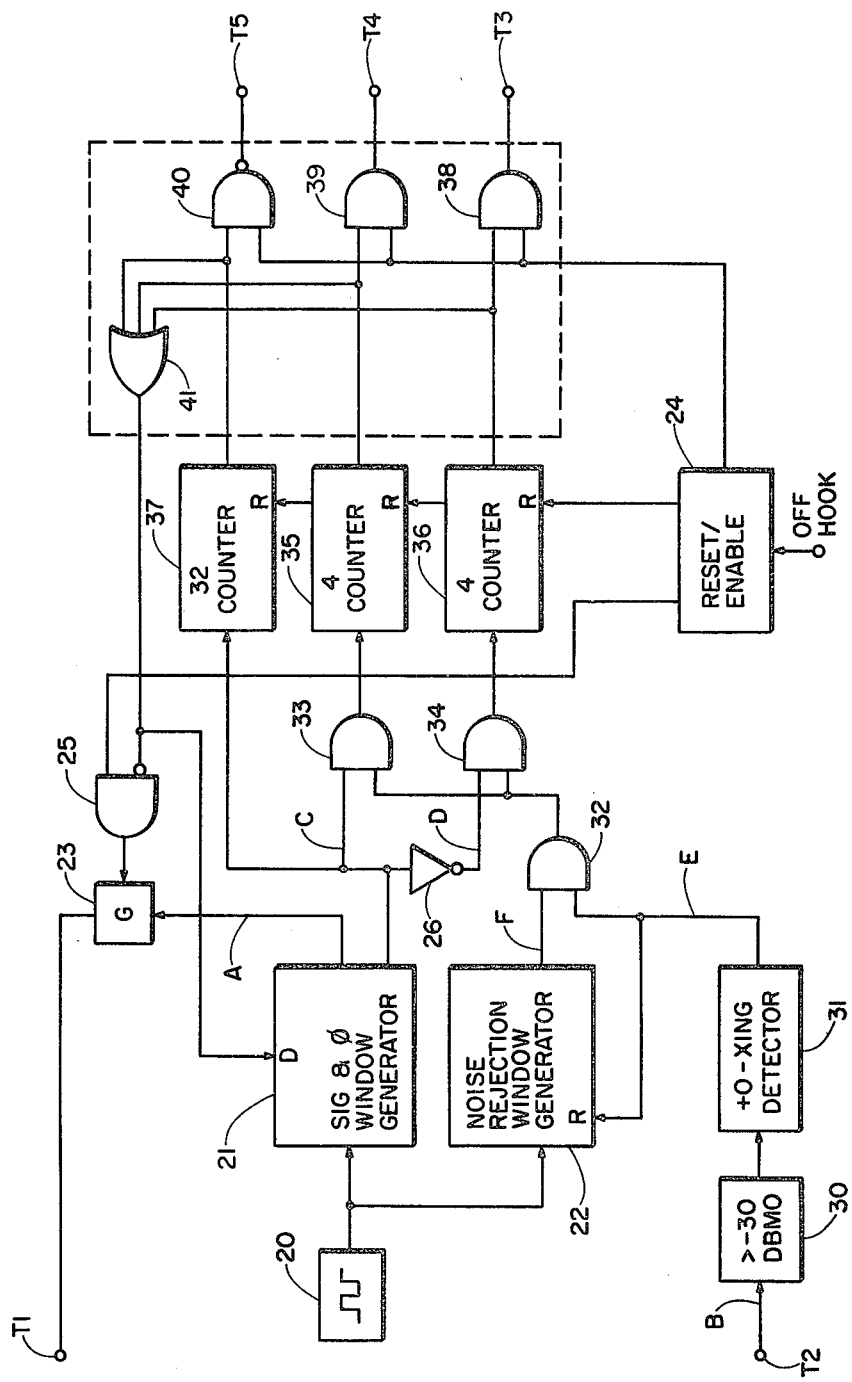
FIG. 2 is a block diagram of a phase comparison and control circuit which is used to control the network illustrated in FIG. 1.
Figure 3:
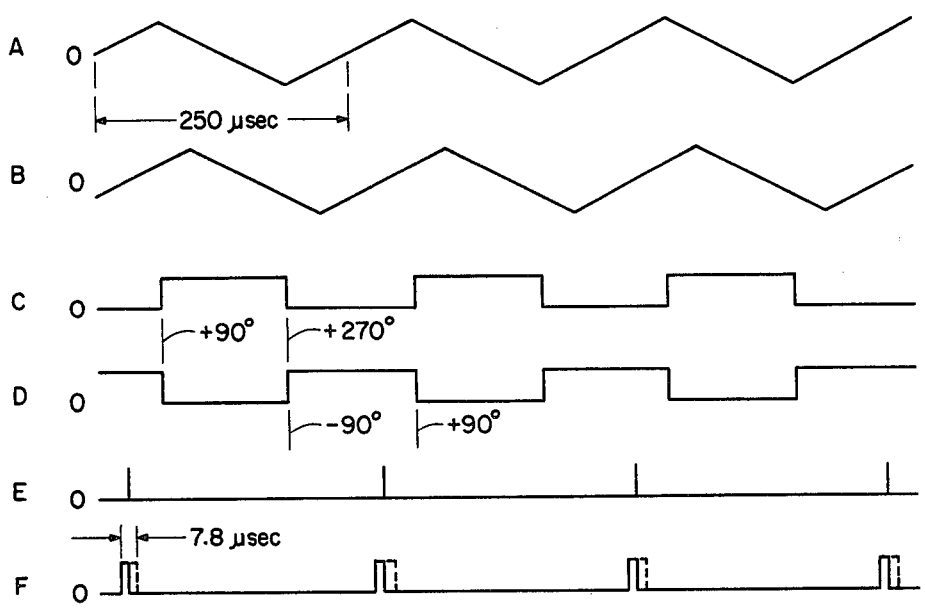
FIG. 3 illustrates typical voltage waveforms at various points of the network illustrated in FIG. 1.

FIG. 3 illustrates typical voltage waveform vs time for various control signals used in the network of FIG. 2. The location of these waveforms is identified by corresponding reference characters in both figures. Referring to FIG. 2, a 128 KHz clock 20 is used to drive a signal and phase window generator 21 and a noise rejection window generator 22. The signal and phase window generator 21 generates a 4 KHz triangular transmit signal A which is coupled through a gate 23 to the input side 12 of the hybrid 10 via T1. The gate 23 is initially activated by a control signal coupled through an AND gate 25 from a reset/enable network 24 which is actuated in turn by the detection of an off-hook signal in a well known manner. It should be noted that a sine-wave signal was not necessary for this application since only the phase is detected and the third harmonic component of the triangular wave is sufficiently small so as to cause little distortion in the phase. The triangular wave is however easier to generate from the 128 KHz clock drive. The generator 21 also generates a $+90°$ to $+270°$ phase control signal C and through the inverter 26, a $-90°$ to $+90°$ phase control signal D.

The return signal B at the output side 13 of the hybrid 10 in FIG. 1 is first coupled via T2 to a $> -30$ dBmo level detector 30. This detector provides an input sensitivity of 10 mV into 400 ohms which rejects reflected 4 KHz signals below $-30$ dBmo since further line balancing is superfluous for signals below this level. Signals which pass through the level detector 30 are then used to generate pulse control signals E by a $+0$ crossing detector 31. The short 500 ηsec. output signals E are used to reset the noise rejection window generator 22 which produces a window pulse F, that is a maximum of $2\times250/64=7.81$ μsec. long and centered 250 μsec. after the reset signal E. This ensures that E is a genuine signal and not a noise spike by rejecting adjacent pulses of E that are not spared by 250 μsec. $\pm$Tx where 2Tx is the small window F (Tx$=250\div64=3.91$ μsec.). Concurrent appearance of pulses E and F, produces an output from an AND gate 32 which in conjunction with control signals C or D produces an output from either AND gates 33 or 34 respectively. This in turn updates either of the counters 35 or 36, both of which have been initially reset by the reset/enable network 24. In addition, the control signal C also updates a counter 37 which has also been reset by the circuit 24. In the example embodiment of FIG. 3, the signal E occurs during the period of D thereby updating the counter 36.

The function of the window generator 22 is to make certain that only the desired return signals are used to update the counters 35 or 36 since spurious signals such as noise from the telephone transmitter, can readily be received and passed through the level detector 30, as the test is made in an off-hook condition. When the number of detected signals in either of the counters 35 or 36 reaches 4, their output in conjunction with an enable signal from the reset/enable circuit 24 opens via T4 or T3 one of the AND gates 39 or 38 respectively. This in turn opens either one of the transmission gates 50 or 51 of FIG. 1 which in turn connects the associated network 52 or 53 between the four-wire sides 12 and 13 of the telephone line. On the other hand, if the return signals B are consistently detected but fail to appear during the window F, the signal C will update the counter 37. This continues until a count of 32 is reached which produces an output that, via T5, actuates a NAND gate 40 which in turn opens the transmission gate 54, that results in a 1 dB pad 55 being placed in series with the output line 13. An output from any one of the counters 35, 36, or 37, is also coupled through an OR gate 41 which resets the phase generator 21 and closes the transmission gate 23 through the gate 25 thereby terminating the phase test and balance network insertion.

Figure 4:
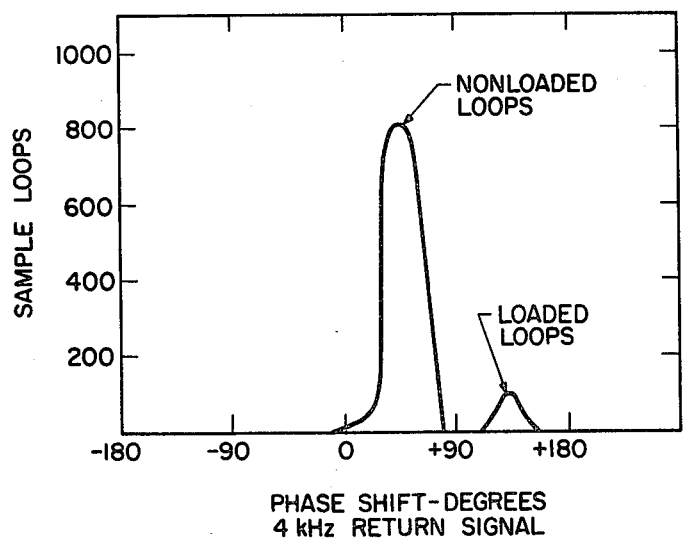
FIG. 4 is a graph of the phase shift of the return signal for a sample number of loops that appear loaded and nonloaded (assuming a particular size of loading coil), as measured by the phase detector in the network of FIG. 2.

The selection of the two phase windows controlled by the signals C and D is based on the measured or computed phase shift of a large number of nonloaded and loaded sample loops as illustrated in FIG. 4. As can be seen, the phase shift of the return signal for non-loaded loops is centered at about $+45°$ with phase shifts between $-10°$ and $+80°$ being encountered. On the other hand, the phase shift for loaded loops is centered at about $+130°$ with phase shifts between about $110°$ and $160°$ being encountered, assuming the use of a standard 88 mH loading coil.

While a 4 KHz transmit signal was utilized, a lower frequency signal could also be used. However, there is some merging of the two curves shown in FIG. 4 so that the lower limit for the transmit signal is in the order of 3 KHz. Higher frequency signals on the other hand are limited by the conventional transmission characteristics of a telephone line which is inherently designed to operate up to about 4.2 KHz.

Enhancement of the singing return loss can be obtained either by altering the balance impedance 14 or by connecting an impedance between the lines 12 and 13 so as to cancel some of the return signal. Integrated circuit techniques do not lend themselves to altering the balance impedance 14 directly due to its relative low value. Consequently connecting an impedance network between the lines 12 and 13 was utilized in view of the relatively high values encountered using this approach.

The networks 52 and 53 can take a variety of forms depending on their complexity and the desired level of singing return loss improvement. In their most general form they can be considered to be nth order filters optimized for a given class of loops which can be implemented in a variety of ways including several different integrated circuit schemes.

One of the simplest implementations which yields some SRL improvement is as follows:

Each of the networks 52 and 53 is implemented with the function $(Z-Z_o)/(Z+Z_o)$, where $Z$ is a compromise line impedance and $Z_o$ is the nominal balance impedance.

The networks 52 and 53 are connected so that the two signals subtract by connection through a dual input amplifier 56 as shown. Thus the phase of the amplifier 56 with respect to that of the hybrid 10 is such that partial cancellation of the leakage signal from input 12 to output 13 takes place. Each network 52 or 53 is optimized for one of the loop impedance groups segregated by the phase detector of FIG. 2.

In a typical case, the mean SRL increased from 7.6 to 12.3 dB at upper frequencies of the voice band with only a small reduction in the mean from 9.2 to 8.5 dB at the lowest voice frequencies giving an overall improvement in the singing return loss across the frequency band.

In some cases the values of the capacitances shown in FIG. 1 are small and do not exert much influence on the SRL. Replacing these networks by simple resistive dividers only slightly degraded the SRL of the worst loops. In any case virtually all loops meet the minimum SRL objective of 4 dB.

What is claimed is:

1. A circuit for improving the singing return loss between the opposed four-wire input and output of a hybrid network for the two-wire to four-wire interface of a telephone line, comprising:

a signal generator for connecting a transmit test signal to said input;

characterized by:

means for determining whether the phase of the return test signal at said output relative to the transmit test signal at said input is within a preselected range for inductively loaded lines;

a control circuit responsive to the phase determining means for connecting a first impedance network between the four-wire input and output of the hybrid network when the return test signal is within said range, and for connecting a second impedance network between the four-wire input and output when the return test signal is outside said range.

2. A method of determining the phase shift of a return test signal from a hybrid network in a two-wire to four-wire interface for a telephone line when the two-wire line is in an off-hook condition comprising the steps of:

connecting a test signal to the transmit side of the four-wire line;

determining each zero crossing of a receive test signal which is returned on the receive side of the four-wire line;

determining whether said zero crossings of the receive test signal fall within first or second portions of the period of the transmit test signal so as to determine whether the two-wire line appears loaded or nonloaded;

comparing the time interval between adjacent zero crossings of the receive test signal to determine whether said adjacent zero crossing resulted from the transmit test signal and/or from spurious signals introduced in the two-wire line; and separately totalizing the instances when the zero crossings of the receive test signal fall within said first or second portions of the period only when a comparison indicates that adjacent zero crossings resulted from the transmit test signal.

* * * * *